(No Model.)

C. E. DARROW.
NUT FOR AXLE SPINDLES.

No. 451,390. Patented Apr. 28, 1891.

Witnesses:

Inventor.
Chas. E. Darrow,
per Lehmann & Pattison,
Attys.

UNITED STATES PATENT OFFICE.

CHARLES E. DARROW, OF KOKOMO, INDIANA.

NUT FOR AXLE-SPINDLES.

SPECIFICATION forming part of Letters Patent No. 451,390, dated April 28, 1891.

Application filed January 17, 1891. Serial No. 378,137. (No model.)

*To all whom it may concern:*

Be it known that I, CHARLES E. DARROW, of Kokomo, in the county of Howard and State of Indiana, have invented certain new and useful Improvements in Nuts for Axle Spindles; and I do hereby declare the following to be a full, clear, and exact description of the invention, such as will enable others skilled in the art to which it pertains to make and use it, reference being had to the accompanying drawings, which form part of this specification.

My invention relates to an improvement in nuts for spindles and special construction, which will be fully described hereinafter, and pointed out in the claim.

The object of my invention is to produce a means for quickly taking up the wear upon the box, and thus doing away with the necessity for washers for preventing the box from having a lateral movement upon the spindle after the ends of the box have become worn.

Figure 1:
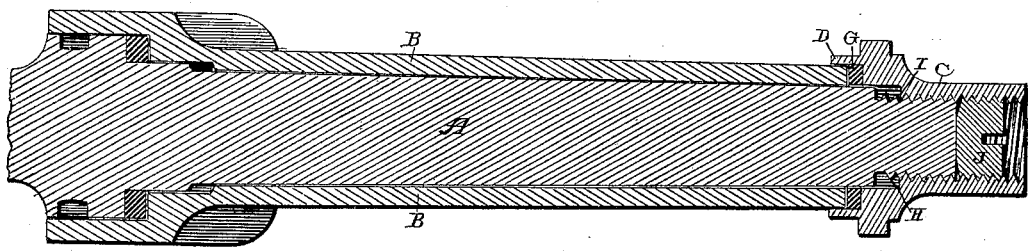
Figure 2:
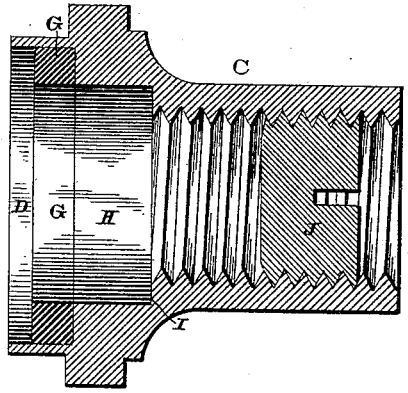

Figure 1 is a vertical section of an axle and its attachments, showing my invention. Fig. 2 is an enlarged vertical section of the nut alone.

A represents the axle, which is screw-threaded in the usual manner at its outer end, and upon which the box B is placed. This box does not extend quite to the smooth portion of the axle, as shown, and in the outer end of the nut C is formed the usual shoulder D for catching over the end of the box, and in this shoulder is placed the washer G. When the parts are constructed in the usual manner, if one or both ends of the box become worn, the box has a lateral movement upon the axle, and washers must be applied at one or both ends in order to take up this lateral play. The application of washers is not only expensive, but requires considerable time, and also requires the washers to be replaced as often as they in turn become worn.

In order to do away with the necessity of applying washers to the box as it becomes worn, the nut is not screw-threaded entirely to the shoulder D in the usual manner, but there is a smooth portion H formed inside of the inner end of the nut, and this smooth portion fits snugly over the outer smooth end of the axle outside of the outer end of the box. This smooth portion H extends inwardly any desired distance to the shoulder I, at which point the usual screw-threaded portion inside of the nut begins for the purpose of enabling it to be screwed upon the screw-threaded portion of the spindle in the usual manner. The nut itself is preferably made slightly longer than is usual, and instead of the nut being closed solidly at its outer end there is a screw-threaded opening made entirely through it, and in this opening is placed the screw-plug J, which closes the opening in the nut, and which, by bearing against the end of the spindle when the nut is screwed up into position, regulates the distance that the smooth portion inside of the nut shall extend over the outer smooth end of the spindle.

As long as the ends of the box have not become worn so as to allow the wheel any lateral play upon the spindle, the screw-plug is forced inward so as to bear against the outer end of the spindle, because there is no need for the smooth portion in the nut to extend any distance over the smooth end of the spindle. As, however, the box becomes worn away and the wheel begins to have a lateral play upon the spindle, the screw-plug is moved outward a suitable distance, so as to allow the nut to screw farther inward upon the screw-threaded portion of the spindle, and thus to allow the smooth portion inside of the nut to extend over the smooth portion of the spindle sufficiently far to bear tightly against the end of the box, and thus hold it between the shoulder upon the axle and the inner end of the nut. Where the box is but little worn, but a very slight outward movement of the plug is all that is necessary, for the nut will then take up all of the wear. If the box has become considerably worn, the screw-plug will have to be moved outward proportionately, so as to allow the nut to be screwed farther upon the spindle, and thus take up the wear.

It will be seen that the farther the screw-plug is forced into the nut the smaller amount of hold the nut takes upon the screw-threaded end of the spindle, and that the farther the plug is moved outward the greater the hold and the farther the inner end of the nut is moved inwardly over the smooth outer end of the spindle, so as to follow up the wear upon the box. These nuts having the internal smooth portion, the internal shoulder and the screw-plug will be made to be sold separately, and thus enable them to be applied to old vehicles of all kinds.

Having thus described my invention, I claim—

The combination, with the spindle having a screw-threaded outer end, of a box which is shorter than the smooth portion of the spindle, a nut having a longitudinal opening the outer end of which is screw-threaded and the inner end made smooth to receive the extending smooth end of the spindle, a washer placed around the smooth portion of the spindle between the adjacent ends of the box and nut, and an annular flange extending from the inner end of the said nut over the said washer and the short end of the box, whereby the washer and the outer end of the box are entirely inclosed, and a screw-plug in the outer end of the nut, substantially as shown and described.

In testimony whereof I affix my signature in presence of two witnesses.

CHARLES E. DARROW.

Witnesses:
JACOB COIBION,
W. T. BALDWIN.